No. 669,720. Patented Mar. 12, 1901.
C. W. BROWN.
COTTON GIN FEEDER.
(Application filed May 12, 1900.)
(No Model.) 2 Sheets—Sheet 1.
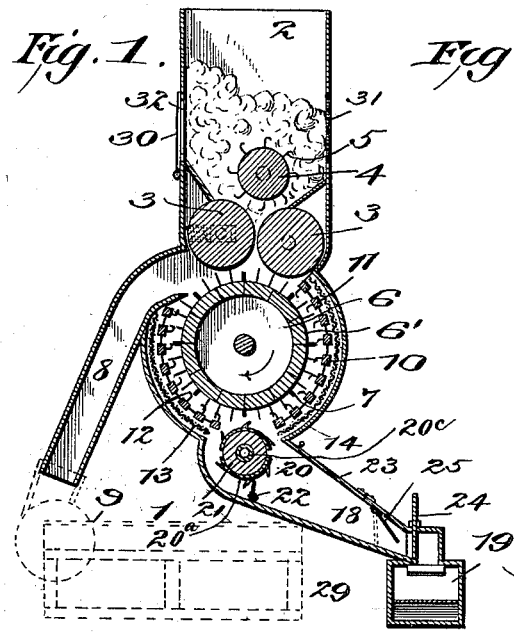
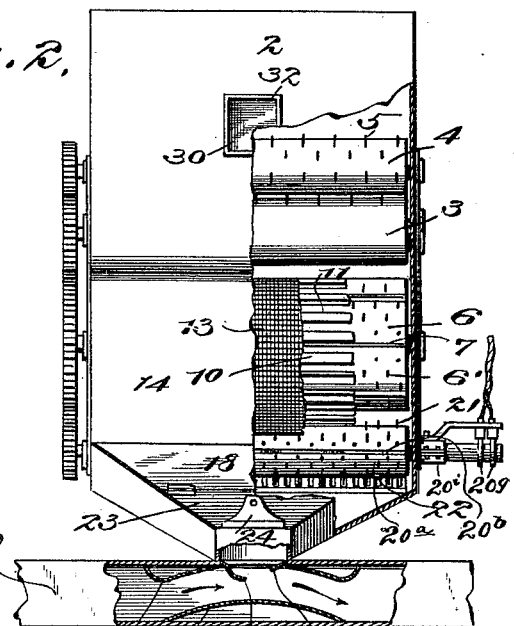
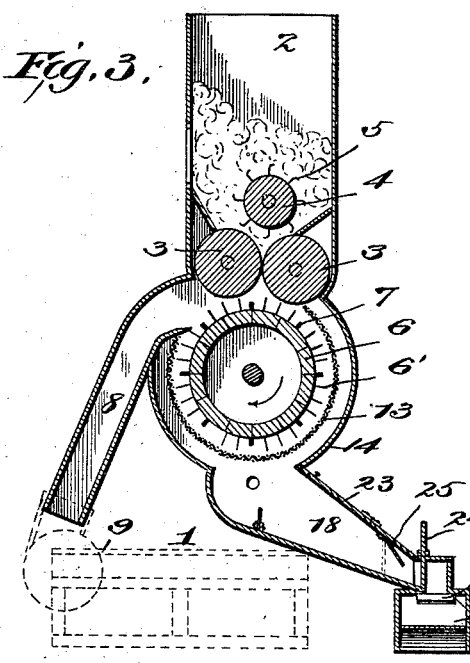
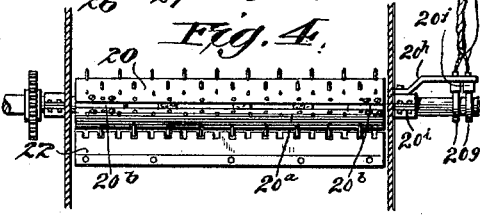
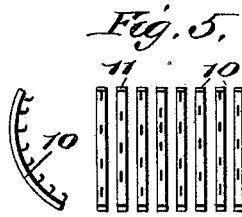
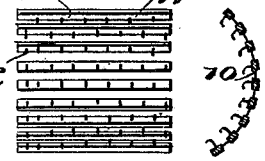
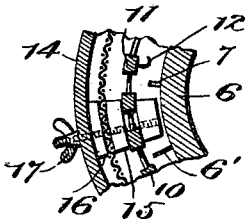
Inventor:
Charles W. Brown,
Witnesses No. 669,720. Patented Mar. 12, 1901.
C. W. BROWN.
COTTON GIN FEEDER.
(Application filed May 12, 1900.)
(No Model.) 2 Sheets—Sheet 2.
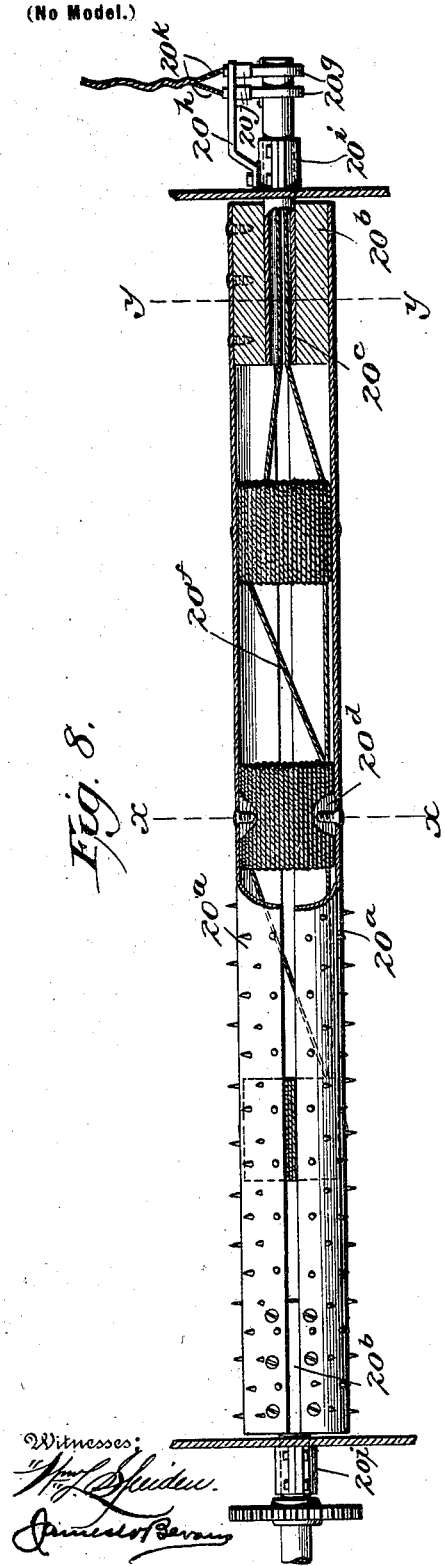
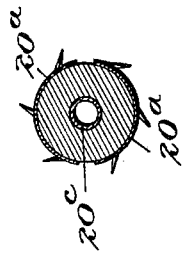
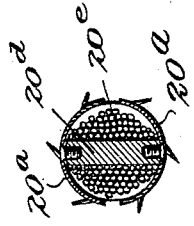
Inventor:
Charles W. Brown,

UNITED STATES PATENT OFFICE.

CHARLES WILLIAM BROWN, OF DALLAS, TEXAS, ASSIGNOR OF ONE-HALF TO R. L. HEFLIN, OF GALVESTON, TEXAS.

COTTON-GIN FEEDER.

SPECIFICATION forming part of Letters Patent No. 669,720, dated March 12, 1901.

Application filed May 12, 1900. Serial No. 16,499. (No model.)

*To all whom it may concern:*

Be it known that I, CHARLES WILLIAM BROWN, a citizen of the United States, residing at Dallas, in the county of Dallas and State of Texas, have invented a new and useful Cotton-Gin Feeder, Drier, and Cleaner, of which the following is a specification.

My invention relates to cotton cleaners and driers, and has for one of its objects to produce an apparatus of this class which will disintegrate, dry, and clean damp and dirty seed-cotton and feed the same to a gin-stand.

Another object is to utilize the exhaust from the blow-fan used in all cotton-ginning plants to convey away the dirt and dust taken from the cotton.

Another object is to reduce the expense in the construction of the entire device, including the dirt-conveyers, by dispensing with the pulleys and other mechanism generally used in belt conveyers.

Another object is to so construct the device that when placed on a gin-stand every working part of the gin-stand is left accessible, so that any part of the gin may be removed and replaced without the necessity of removing the drier, thereby saving time to the ginners.

Another object is to provide the device with a magnetic roller or cleaner for the purpose of picking up nails, pocket-knives, horseshoes, &c., that frequently find their way into the mass of cotton and very seriously injure the machine unless removed.

Another object is to provide the device with removable conveyers and casings, so that the machine may be used upon clean cotton or other fibrous material.

With these objects in view my invention consists in the improved construction and novel arrangement of parts of such a device, as will be hereinafter more fully set forth.

In the accompanying drawings, in which the same reference-numerals indicate corresponding parts in each of the views in which they occur, Figure 1 is a vertical sectional view of a machine embodying my invention. Fig. 2 is a front elevation, partly in section. Fig. 3 is a vertical sectional view with some of the parts removed. Fig. 4 is a side view of the magnetic cleaner-roller and its non-magnetic wiper. Figs. 5, 6, and 7 are detail views. Fig. 8 is an enlarged view of the magnetic roller, the same being shown partly in elevation and partly in section. Fig. 9 is a transverse section on the line $x\ x$ of Fig. 8, and Fig. 10 is a similar view on the line $y\ y$ of said figure.

Referring more particularly to the drawings, 1 indicates the ordinary gin-stand, upon which my machine is secured in any desired manner, the same being so arranged that access can be had to either one without interference from the other.

2 indicates the hopper of my improved cleaner, in the lower end of which are journaled two pressure-rollers 3 3 and the feed-roller 4. The feed-roller 4 is provided with the usual teeth 5 for delivering the cotton to the feed-rollers, and the feed-rollers are arranged to run in close contact, and one or both of them is provided with the usual means for holding it in yielding relation to the other one.

Journaled directly beneath the feed-rollers is a picker-roll 6, which is provided with suitable spiked teeth 6' and also with longitudinally-arranged fan-blades 7, made of leather or other suitable material, which should project from the periphery of the roller to half the length of the spiked teeth. The spiked teeth are made of such a length as to pick the cotton from the bite of the feed-rolls, disintegrate it, and deliver it by concentrifugal motion through the chute 8 onto the feed-apron 9, by means of which it is conveyed to the mouth of the gin-stand 1. The roll 6 is run at such a high rate of speed that the fan-blades 7 will create a strong blast and at the same time aid the picker in beating and separating the dirt and trash from the cotton and drying the cotton to such an extent as to prevent the gin-saws from gumming and avoid the necessity of drying damp cotton by artificial means.

Surrounding the picker-roll 6 is a concave or breaker 10, which is provided with vertically or horizontally arranged ribs 11, the inner faces of which are provided with inwardly-extending teeth 12, which engage with the material being fed and assist in breaking up any heavy sticks, trash, &c., that might be in the cotton and permitting the same to pass to the rear of the concave, and thus be separated from the cotton. The teeth 12 of the concave are preferably curved in the direction of the passage of the cotton and extend inward until they barely miss the outer edges of the fan-blades 7.

Located directly to the rear of the breaker is a perforated concave or screen 13, which may be formed from sheet metal or from woven wire. Outside of the screen 11 is an air-tight casing 14, which completely surrounds the same except at the bottom and at the entrance and exit at the top. The two concaves and the casing are each made in separable sections, so that they may be readily removed from around the picker-roll and replaced. By construcing the concaves and casing in this manner when it is desired to run clean cotton or other fiber through the machine the toothed concave 10 may be removed and the perforated concave or screen 13 put in its place and the casing or covering be placed upon the outside of the screen in the same manner as though the concave were present. One means of effecting this change is by securing the breaker in position by means of suitable bolts, which pass through the framework for this purpose, and by placing suitable space-blocks 15 between the breaker and the perforated concave and also with suitable space-blocks 16 between the concave and the casing and holding all of the parts in position by means of thumb-nuts or thumb-screws 17. In making the change the thumb-nuts are taken off and the breaker, concave, and the casing are removed, and the concave is then replaced in the same space from which the breaker was removed and the casing and its space-blocks secured outside of the concave. In this manner the face of the perforated concave is brought into close proximity with the picking-roll and the machine is arranged for operating upon clean cotton, as shown in Fig. 3.

Arranged below the casing and communicating therewith is a chute 18, which leads to and communicates with an air-blast pipe 19, which is preferably arranged to the rear of the gins, as shown in Fig. 3. When the machine is being used for cleaning dirty and trashy cotton, a roller 20 is journaled in the mouth of the chute, in position for the hooked teeth 21 upon its periphery to pass between the teeth 6' on the picker-roll, as shown in Fig. 1. This roller is rotated so that its teeth will move in the opposite direction from the teeth of the picker-roll where they pass each other, whereby the roller 20 will engage with foreign substances that are being carried forward by the cotton. It will also engage with any cotton which may have found its way through the breaker 10 and the concave 13 and is passing down into the chute from the casing 14 and return it to the teeth of the picker-roll upon the opposite side of the chute, so that it can be carried out and delivered to the gin. For the purpose of engaging with metal particles or objects which may find their way into the machine I prefer to make the roller 20 a revolving electromagnet, as illustrated in Figs. 8, 9, and 10. By reference to said figures it will be seen that said roller consists of two semicircular metallic shells $20^a$, supported in proper position to form the roller by being secured at their ends to circular blocks $20^b$, which extend thereinto and are of such size as to support the shells with their edges out of contact. Said blocks are formed with central openings, in which hollow journals $20^c$ are secured, said journals projecting therefrom and mounted in the framework of the machine. These journals are well insulated from the shells. Secured in said hollow roller formed by the two shells are a number of soft-steel blocks $20^d$, which are wound with insulated copper wire $20^e$. These blocks are connected by insulated copper wire $20^f$, the two ends of which pass through one of the hollow journals and are connected with insulated copper rings $20^g$ upon the outer end of said journal. A bracket $20^h$ is made fast to and insulated from one of the journal-boxes $20^i$ and supports brushes $20^j$, which contact with the peripheries of said rings $20^g$ and to which are connected wires $20^k$, leading through a suitable source of electricity. The electric current from said wires passes through the several poles in the roller and magnetizes the steel shells and the projections upon the outer surfaces thereof, so that the metal particles or objects passing into the machine with the cotton will be attracted to said projections or teeth and carried around until they are removed by a wiper 22, which can be formed from some non-magnetic material—as, for instance, rubber—and slit or provided with teeth between which the teeth of the roller pass as it is revolved. A suitable door 23 is hinged at the top of the chute for the purpose of getting access to the roller at any time. When clean cotton is being run through the machine and the toothed breaker 10 has been removed, as above described, it is evident that the main function of the roller 20 will be needless, and, if desired, the roller may be removed and the machine arranged as shown in Fig. 2. The chute is preferably contracted at its sides and also from the top to the bottom and is provided at its lower end with a gate or slide 24. A suitable valve 25, preferably formed from canvas or other suitable material, is arranged at the lower end of the chute in such a manner as to permit of the passage of the trash and other particles removed from the cotton, but which will prevent the air passing out of the blast-pipe 19 in case either one of the machines should be stopped. In the air-blast pipe, directly underneath where the chute enters thereinto, the top and bottom walls of the blast-pipe are curved upward, as shown at 26 and 27, so as to cause a strong sharp blast at this point, and thus prevent the formation of an air eddy at the opening of the chute. A slightly-curved piece of sheet-iron 28, slightly crooked at its lower end, projects into the blast-pipe a sufficient distance to prevent any back pressure, and it is arranged at a sufficient angle to prevent it from obstructing the free passage of the blast.

29 is a sheet-iron piece projecting into the blast-pipe at right angles to and slightly above the curved piece 28 at a sufficient distance therefrom to allow of the free passage of all dirt and trash from the chute to the blast-pipe. The blast-pipe may be supplied with air from a separate fan or blower. (Not shown, as it forms no part of my invention.)

As above described, one of my improved cleaners and driers can be located above the gin-stand and placed in communication with the blast-pipe to the rear. The cotton is fed into the hopper in the usual way, from which it will be gradually fed by the pressure-rollers to the picker-roll below. From the pressure rollers the cotton is carried around the picker-roll, and any trash or dirt or foreign substance that may be in it is separated therefrom and driven through the breaker 10, where a portion of it will pass down into the chute, while the finer particles are driven through the perforated screen or concave and pass down between the concave and the casing into the chute. The rapid rotation of the picker-roll will cause its blades, which are arranged at a suitable distance around the periphery of the roll between certain rows of the teeth upon the roll, to generate a sufficient current of air to rapidly dry the cotton as it is passing through the machine. As the cotton is forced out of the casing through the chute 8 at the top it is taken up by the feed-apron 9 and delivered to the gin-saws. The rollers 3 3 and 4 are so arranged and operated by the ordinary changeable-speed gear that at any time, even while the machine is in operation, the feed can be changed or regulated at will. In this manner I can run the picker-roll at a much higher rate of speed than with the ordinary means for this purpose, thereby utilizing the current of air generated by its fan-blades for drying the cotton.

Suitable site-openings 30 and 31 are arranged in the front and rear walls, respectively, of the hopper for the purpose of enabling the attendant to determine at all times the amount of cotton within the hopper. The front opening is preferably arranged in a movable or hinged shutter or door 32, which may be opened to give access to the feed-rollers. The chute 8 is preferably made so that it can be removed at any time to permit access to the operating parts of the gin-stand without having to remove the cleaner and drier. If at any time it should be desirable to shut off any one of my machines from the air-blast pipe, the gate or slide 24 is closed, and the rest of the machines will operate in the same manner as though all of the machines were in operation. As the material is passing around the picker-roll it is subjected to rapid and violent blows from the picker-teeth, and any trash or dirt therein is loosened and separated from the material and violently driven or blown through the breaker and the casing, from whence it passes down into the chute and is carried away by the powerful suction through the air-blast pipe.

Although I have shown what I consider to be the most desirable form of constructing my improved cleaner and drier, yet I reserve the right to make such changes and alterations as will come within the scope of my invention.

Having thus fully described my invention, what I claim as new, and desire to secure by Letters Patent, is—

1. In a cotton-cleaner, the combination, with a hopper, of feed-rollers therein, a casing below the hopper, a picker-roll journaled within the casing, and a toothed breaker and a perforated screen between the picker and the casing, said breaker being removable, substantially as described.

2. In a cotton-cleaner, the combination, with a hopper, of feed-rollers therein, a separable casing below the hopper provided with a refuse-chute and a delivery-chute, a picker-roll journaled therein, a breaker and a perforated concave between the picker-roll and the casing, said breaker and concave being separable and removable, and spacing-blocks and bolts for holding the parts together, substantially as described.

3. In a cotton-cleaner, the combination, with a hopper, of feed-rollers journaled therein, a casing below the hopper provided with a refuse-chute and a delivery-chute, a picker-roll journaled in the casing, a breaker and a perforated concave between the picker-roll and the casing, and a roller journaled in the mouth of the refuse-chute provided with teeth which move in the opposite direction to the teeth of the picker-roll where they pass each other, substantially as described.

4. In a cotton-cleaner, the combination, with a hopper provided with feed-rollers, of a casing below the hopper provided with a refuse-chute and a delivery-chute, the refuse-chute communicating with the air-blast pipe and the delivery-chute with the gin-saws of the gin-stand, a toothed roller journaled in the mouth of the refuse-chute below the picker-roll, and a wiper for engaging with the teeth thereof, substantially as described.

5. In a cotton-cleaner, the combination, with a hopper, of feed-rollers journaled therein, a casing below the hopper provided with a refuse-chute and a delivery-chute, a picker-roll journaled in the casing, a magnetic cleaning-roller journaled in the mouth of the chute below the picker-roll, and a wiper of non-magnetic material in position to engage with the teeth of the magnetic roller and remove metallic substances therefrom, substantially as described.

6. In a cotton-cleaner, the combination, with a hopper, of feed-rollers journaled therein, a casing below the hopper provided with a refuse-chute and a delivery-chute, an air-blast pipe at the exit of the refuse-chute, and a gate and two valves in the lower end of the refuse-chute, substantially as described.

CHARLES WILLIAM BROWN.

Witnesses:
THOS. B. GRAMBLING,
J. E. DAVIS.